US008330964B2

(12) United States Patent
Olbrecht et al.

(10) Patent No.: US 8,330,964 B2
(45) Date of Patent: Dec. 11, 2012

(54) METHOD FOR DETECTING OBJECTS (75) Inventors: Torsten Olbrecht, Bobenheim-Roxheim (DE); Benedikt Rauscher, Oberursel (DE); Ernst Tabel, Hamburg (DE)

(73) Assignee: Pepperl + Fuchs GmbH, Mannheim (DE)

( * ) Notice: Subject to any disclaimer, the term of this patent is extended or adjusted under 35 U.S.C. 154(b) by 339 days.

(21) Appl. No.: 12/857,770

(22) Filed: Aug. 17, 2010

(65) Prior Publication Data

US 2011/0075155 A1  Mar. 31, 2011

(30) Foreign Application Priority Data

Aug. 19, 2009  (EP) ..................................... 09010689

(51) Int. Cl.
*G01B 11/30* (2006.01)
*G01B 11/24* (2006.01)
(52) U.S. Cl. ........................................ 356/601; 356/613
(58) Field of Classification Search .... 356/237.1–241.6, 356/242.1–243.8, 426–431, 600–640
See application file for complete search history.

(56) References Cited

U.S. PATENT DOCUMENTS

| | | | | |
|---|---|---|---|---|
| 4,144,449 A * | 3/1979 | Funk et al. | ..................... | 250/221 |
| 6,031,242 A * | 2/2000 | Hudson | ......................... | 250/548 |
| 6,046,462 A * | 4/2000 | Yokajty et al. | ........... | 250/559.08 |
| RE38,025 E * | 3/2003 | Skunes et al. | ................. | 356/400 |
| 6,542,249 B1 * | 4/2003 | Kofman et al. | ............... | 356/601 |
| 7,599,071 B2 * | 10/2009 | Dillon et al. | ................... | 356/521 |
| 2003/0218741 A1 * | 11/2003 | Guetta | ....................... | 356/237.1 |

* cited by examiner

*Primary Examiner* — Gregory J Toatley
*Assistant Examiner* — Jarreas C Underwood
(74) *Attorney, Agent, or Firm* — John A. Merecki; Hoffman Warnick LLC (57) ABSTRACT

The invention relates to a method for detecting objects in which a light pattern is beamed by a plurality of transmitting modules into an observation zone, the transmitting modules being spaced to each other, in which light radiated back from the observation zone is detected by at least one spatially resolving detector unit, in which a surface contour of an object located in the observation zone is determined on the basis of the detected light according to the light section principle, in which a maximum spatial resolution is caused by the intervals at which the transmitting modules are spaced from each other. The method is characterized in that in an overview measurement, a first selection of transmission modules is activated, a first spatial resolution is defined by the first selection of transmission modules, in an object measurement, a second selection of transmission modules is activated, a second spatial resolution is defined by the second selection of transmission modules or by the second selection of transmission modules together with at least a selected number of the transmission modules pertaining to the first selection, which second spatial resolution is greater than the first spatial resolution.

16 Claims, 6 Drawing Sheets

Fig. 7

METHOD FOR DETECTING OBJECTS

TECHNICAL FIELD

The present invention relates to a method for detecting objects.

RELATED ART

In a generic method such as the one disclosed in U.S. Pat. No. 6,542,249, a light pattern is beamed into an observation zone by a plurality of transmission modules spaced at intervals relative to each other. Light radiated back from the observation zone is detected with at least one spatially resolving detector unit and a surface contour of an object located in the observation zone is determined on the basis of the detected light, according to the light section principle. Herein, a maximum possible spatial resolution is governed by the intervals at which the transmission modules are spaced relatively to each other.

Methods of the aforementioned type, which are very generally employed for two-dimensional or three-dimensional scanning of objects with camera systems, are used, for example, for numerous tasks in the field of industrial fabrication and automation technology. Prior to the installation of a car door in a car body, for example, it is possible to check whether the door clearance, in other words the distance between the door and a surrounding profile of the car body, has a constant value all round the periphery. This is of great importance in the automobile industry.

To this end, a first robot brings the door to be installed near to the car body. The door clearance is then examined around its periphery with a light section sensor, which is guided, for example, by a second robot. The door is then adjusted until the door clearance is as peripherally uniform as possible.

The increasing demand for very high measurement speeds and measurement rates in general poses another problem in this context. In particular, the large volumes of data generated with a large number of transmission modules in a single scan, may prove to be a disadvantage.

SUMMARY OF THE INVENTION

The provision of a method of the aforementioned type in which the measurements can be performed particularly quickly but nevertheless accurately may be viewed as an object of the invention.

The method of the aforementioned type is developed, according to the invention, in that a first selection of transmission modules is operated during an overview measurement, that a first spatial resolution is given by the first selection of transmission modules, that a second selection of transmission modules is operated during an object measurement, and that a second spatial resolution greater than the first spatial resolution is given by the second selection of transmission modules or by the second selection of transmission modules together with at least a selected number of transmission modules pertaining to the first selection.

An aspect of the invention may be regarded as being the initial execution of an overview measurement employing a generic method in which overview measurement use is made of only a portion of all of the available transmission modules.

In a second measurement, also referred to as an object measurement, use is then made of a second selection of transmission modules, in which the spatial resolution is either greater, i.e., the transmission modules employed are spaced at narrower intervals relatively to each other, or the spatial resolution obtained together with a selected number of the transmission modules pertaining to the first selection is, in any case, greater than the first spatial resolution.

The fact that an overview measurement can be provided in a very short time and that it is then possible to analyze the actual object to be detected, particularly with a better spatial resolution, may be viewed as a substantial advantage of the present invention.

In this way, the speed of measurement can be significantly increased.

In an advantageous variant of the method of the invention, information concerning the actual object to be detected is used for selecting the transmission modules for the overview measurement and/or for the object measurement. Such information can comprise geometric data concerning the objects in question as well as geometric data on other objects from which the objects presently to be detected are to be distinguished. This governs the precision with which the surface contours must be determined in any given case.

Furthermore, special problems can arise with methods of the aforementioned type when the objects to be examined have a certain color that does not sufficiently reradiate the light of the transmission modules. For example, such would be the case in examining green objects with a sensor emitting red light. The red light would be absorbed by the green object to a large extent and only radiated back to a slight extent.

In the automobile industry at the present time, car doors are installed in the car body unpainted, for engineering reasons. However, there are plans to change this procedure such that painted doors can be installed in car bodies that have also already been painted. This would mean that with certain paint colors, the sensors previously used for determining door clearance could no longer be used due to insufficient back radiation. As prior sensors frequently operate with red light, the door clearance for green car doors could therefore only be poorly examined. Since measurements are usually not performed in reflection geometry, highly reflective or shiny surfaces such as those coated with a high gloss paint finish are also problematic, as very little light is radiated in directions other than the reflection direction.

In a variant of the method of the invention, transmission modules emit light of at least two different wavelengths, and the light of the at least two different wavelengths is directed onto the object along a common beam path.

A method is thus provided by means of which objects can be examined largely regardless of their color. Furthermore, correct functioning of the method of the invention can be readily verified.

The idea of no longer using light of just one wavelength but of using a plurality of wavelengths from the outset and beaming them onto the object to be examined can be viewed as another aspect of this development of the invention. This provides basically more possibilities for evaluation.

The idea of directing the different wavelengths into the observation zone along one and the same optical beam path can be regarded as another aspect of this development of the invention. The structural components can thus be kept compact, on the one hand, and, on the other hand, the beam components are geometrically equivalent, and it is easy to switch from one wavelength to another wavelength during analysis, if necessary.

Extensive tests conducted during the preliminary stages leading to this invention revealed that backscattering is considerably less dependent on the color of the object with non-visible light than with visible light. Hence, in an embodiment of the method of the invention, only non-visible light is detected and used for analysis.

The use of the method of the invention significantly improves the examination of surfaces that are reflective in the visible spectrum or that strongly absorb certain wavelengths.

The light from the visible light source can be used in a particularly advantageous manner to adjust or align the sensor correctly. Furthermore, the visible light always provides the user with a reliable visual method of checking whether the sensor is correctly positioned, as according to the invention the different wavelengths are focused on the object along one and the same beam path.

Basically, also ultraviolet light sources can be employed as sources of non-visible light. However, particular preference is given to the use of infrared light sources.

To increase the signal to noise ratio, a wavelength-selective band-pass filter can be disposed in front of the detector unit.

In principle, a separate collimator lens can be provided for each light source of a sensor module. In an embodiment of the device of the invention, a collimator lens is provided downstream of the beam splitter in each of the transmission modules. Hence separate collimator lenses for the individual light sources are no longer necessary. The construction of the transmission modules can then be even more compact and is hence particularly well-suited for a multiple-line projector, that is, for implementation of the method of the invention. Furthermore, by using a common collimator lens for both lasers, the number of degrees of freedom for potential tolerances can be reduced.

Basically, all patterns suitable for determining the surface contour of an object may be used as light patterns. Particular preference is given to the use of a striped pattern as a light pattern. Evaluation of the measured data has been found to be particularly easy when the same light patterns are beamed, particularly in parallel, into the observation zone by the transmission modules. As regards equipment, it is advantageous to provide a housing in which a plurality of transmission modules can be accommodated. Particular preference is given to an arrangement of equidistantly spaced transmission modules in the housing.

For the device, it is advantageous when each of the transmission modules has a cylindrical lens for providing a light stripe to be projected onto an object. Basically, any light sources that emit the desired wavelengths at a sufficiently high intensity can be used as light sources. Particular preference is given to the use of laser diodes. The beam splitters used are preferably dichroic beam splitters.

A wider variety of possible applications is achieved when use is made of more than one, more particularly two, detector units capable of detecting different wavelengths of the light radiated back by the object.

Variants of the method in which light of at least two different wavelengths can be detected are thus possible. Furthermore, it is possible to determine for which wavelength the signal to noise ratio is greatest and evaluation can then be carried out on the wavelength thus determined.

When the surface contour of the object to be detected is completely unknown, ambiguities may arise during evaluation, because the structures measured by the spatially resolving detector unit cannot be clearly assigned to partial light patterns projected by the various transmission modules onto the object to be detected.

In order to prevent this, the different transmission modules can advantageously be activated in sequence, more particularly individually. For example, juxtaposed transmission modules can be activated sequentially and cyclically. For carrying out the method of the invention, a special control device can be provided by means of which the first and the second selection are made and which then activates the transmission modules on the basis of these first and second selections.

The assignment of measured data to a specific transmission module or to a specific light stripe is thus considerably simplified, and the functionality of the device of the invention and the method of the invention for three dimensional measurement of objects is significantly increased.

The control device can, for example, be a microcontroller system and each of the transmission modules can be connected via a common data bus to the control device. Each transmission module can have its own address and can thus be independently activated or deactivated. Hence virtually any combination and configuration can be achieved for controlling purposes, and the classical "multiplexing", in which the transmission modules are activated in spatial and temporal sequence, then becomes a special case.

An example of an application could be a measurement situation in which an object has a hole of which the diameter needs to be measured with high precision. The position of the object, and hence of the hole, in the measuring window, however, is variable. In the classical and conventional use of multiplexing, it is necessary to activate and evaluate a great number of laser lines across the entire measuring window due to the required measurement precision for determining the diameter of the hole. This involves considerable computation effort and time. The method of the invention offers the advantage of simply finding the hole with laser lines in a coarse raster grid in an initial step. High density laser lines are then activated exclusively on the located hole zone in order to measure the diameter of the hole precisely. By precisely controlling the individual transmission modules, it is thus possible to significantly improve the efficacy of surface scanning by the laser light section sensor.

Basically, the transmission modules can be randomly selected. In advantageous variants of the method, however, the transmission modules pertaining to the first selection and/or the transmission modules pertaining to the second selection are spaced equidistantly from each other.

In other embodiments of the method of the invention, the measurement involves scans performed in the sense that the juxtaposed transmission modules pertaining to the first selection are activated in immediate sequence, one after the other. In this case, transmission modules separated by other transmission modules not pertaining to the first selection are also considered as juxtaposed transmission modules. Hence such a scan can also be designated as an overview scan.

Correspondingly, the juxtaposed transmission modules pertaining to the second selection can be activated in immediate sequence, one after the other, in order to perform an object scan. The characteristic of being juxtaposed likewise applies to such transmission modules pertaining to the second selection that are separated by a transmission module that does not pertain to the second selection, however.

According to the sampling theorem, for the second spatial resolution, the smallest interval of the light pattern generated by the transmission modules may be less than one half of a linear dimension of an object to be detected. In this manner it is easier to obtain error-free object allocation.

Even more time can be saved in recording the measurement data when an overview measurement is stopped as soon as an object has been detected and the measurement is then directly continued as an object measurement, more particularly as an object scan.

Particularly, advantageous variants in which an overall detected zone is larger in an overview measurement than in an object measurement are possible with the method of the invention. The overview measurement, in particular, can thus be performed in virtually the same time as the actual object measurement or, depending on the selection of transmission modules, possibly in even less time.

BRIEF DESCRIPTION OF THE DRAWINGS

Other advantages and features of the invention are described below with reference to the appended diagrammatic figures.

DETAILED DESCRIPTION OF THE INVENTION

A first variant of a transmission module 20 for a device for carrying out a method of the invention is described with reference to FIG. 1. Equivalent components are designated with the same reference numerals in all figures.

Figure 1:
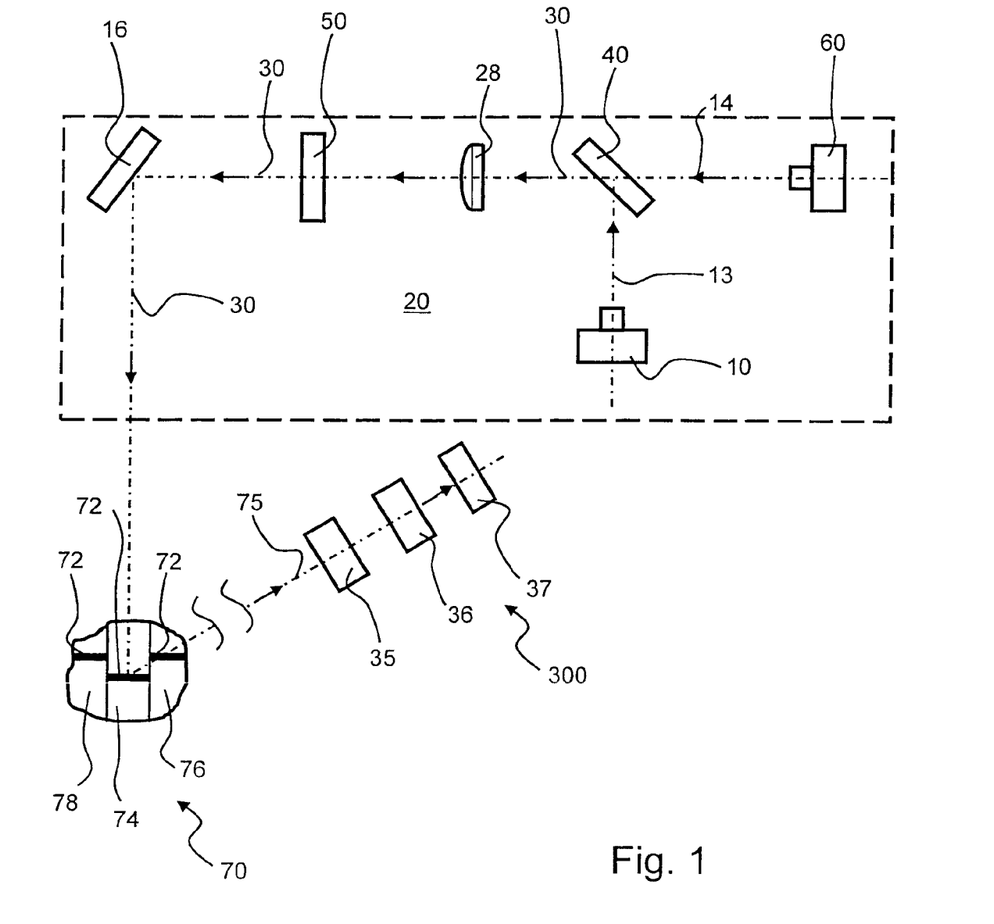
FIG. 1 shows a first exemplary embodiment of a transmission module for a device for carrying out the method of the invention.

The transmission module 20 shown in FIG. 1 comprises a first laser diode 10 as a first light source and a second laser diode 60 as a second light source. There are then provided a dichroic beam splitter 40, a collimator lens 28, a cylindrical lens 50 and a mirror 16. These components are accommodated in a housing, which is not shown in any greater detail.

In the example illustrated, the first laser diode 10 emits red light 13 and the second laser diode 60 emits infrared light 14. The red light 13 and the infrared light 14 are combined via the beam splitter or splitter mirror 40 to form a common beam path 30 and directed by means of the collimator lens 28 to the cylindrical lens 50, which converts the formerly rotationally symmetrical beam profile into a striped profile. This striped profile is then deflected via the mirror 16 and beamed onto an object 70 diagrammatically illustrated in FIG. 1. Because only a single cylindrical lens 50 is used in the transmission module 20 for widening the beam, it is possible to reduce the degrees of freedom for potential tolerances even further. By deflecting the light beam with the mirror 16, the total optical path leading to an object is lengthened. For an equal length of a light stripe to be projected onto an object, it is possible, by means of the beam deflection, to further reduce the divergence angle of the beam bundle and thus to increase the homogeneity of the luminous intensity of the light stripe.

The object 70 to be examined is a portion of the region of a clearance 74 between a vehicle door 76 and a vehicle body 78. The shape of a light stripe 72 beamed onto this region is illustrated diagrammatically. The shape of this light stripe 72, which in the example shown is visible to a user as a red light stripe and which is also beamed onto the object 70 as infrared light because of the common beam path, is detected by a detector unit 300, which is also illustrated diagrammatically.

After passing through a receiving objective 35, the light 75 radiated back by the object 70 to be detected passes through a band-pass filter 36, which lets substantially only the infrared fraction of the light to pass through to the detector or image recorder 37. The detector or image recorder 37 can, for example, be a two-dimensional CCD or CMOS chip.

Infrared lasers are particularly well-suited for use on painted surfaces, including painted car doors, for example. Furthermore, by means of the band-pass filter 36, which can be an infrared pass filter or in general a second-order band-pass filter, it is possible to increase the signal to noise ratio significantly and thus render the application to a large extent independent of daylight influences.

It is important for the measuring principle that the direction in which the light pattern is beamed onto the object 70 to be detected does not coincide with the direction of detection. This means that a triangulation measurement is performed. For example, this angular offset between the projecting and monitoring directions for a given suitable relative alignment of the device of the invention relative to the door clearance to be examined causes the light stripe 72 illustrated diagrammatically in FIG. 1 to show an abrupt downward misalignment in the region of the door clearance 74. The surface contour and hence the width of the door clearance 74 can be determined from the course of this misalignment.

Figure 2:
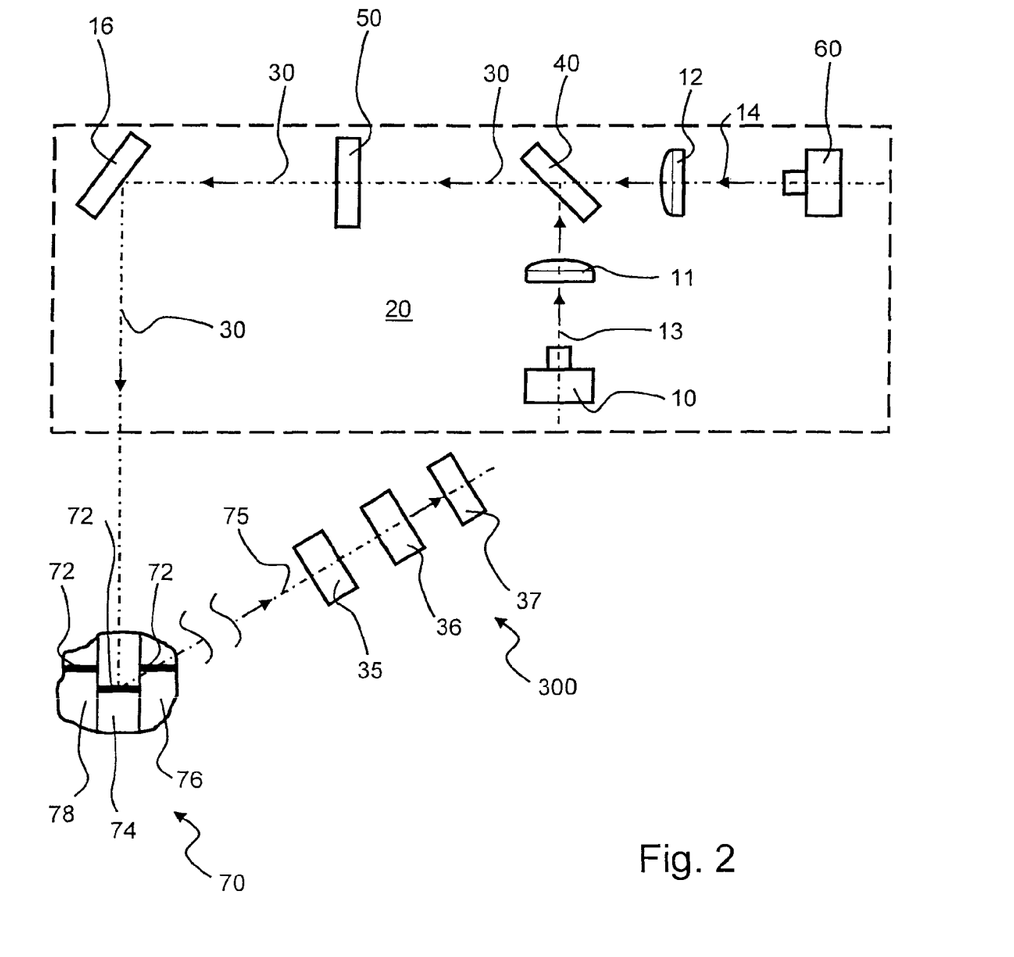
FIG. 2 shows a second exemplary embodiment of a transmission module for a device for carrying out the method of the invention.

The exemplary embodiment shown in FIG. 2 differs from the variant shown in FIG. 1 in that a separate collimator lens 11, 12 is provided for each of the first laser diode 10 and the second laser diode 60. In other respects, this exemplary embodiment corresponds to the situation shown in FIG. 1.

Two exemplary embodiments of devices 100 for carrying out the method of the invention are described with reference to FIGS. 3 and 4. In both variants a plurality of transmission modules 21 to 24, which, for example, can be configured as in the embodiment shown in FIG. 1, are accommodated in a housing 80. Further transmission modules, which are represented by dots in FIGS. 3 and 4 for the sake of clarity, are in fact interposed between the transmission modules 21 and 22. These dots indicate that the total number of transmission modules can be basically variable and generally very large, if desired. The transmission modules 21 to 24 in the housing 80 are always spaced equidistantly from one another and are aligned in the same direction. This means that the optical axes 31 to 34 are always parallel to each other and spaced at equal intervals (the interval 90). The interval 90, which is substantially defined by the width of the transmission modules 21 to 24, can typically be 10 mm, so that parallel light stripes always separated from one another by 10 mm are then projected onto an object 70 to be detected.

The transmission modules 21 to 24 are connected to a diagrammatically illustrated bus system 86, which in turn is connected to a control and evaluation unit 400. The total number of transmission modules is in principle limited only by the facilities of the bus system 86 and the capacity of the housing 80.

The light 75 radiated back by the object 70 to be detected is detected by a detector unit 300, which is also connected to the control and evaluation unit 400. A base width 82 is defined by the distance separating the detector unit 300 from the transmission modules 21 to 24. For geometrical reasons, the base width must increase the greater the distance of the object 70 to be detected from the sensor 100, in order to perform the triangulation measurement. The differences of the variants of the device of the invention illustrated in FIG. 3 and FIG. 4 relate to this aspect.

Figure 3:
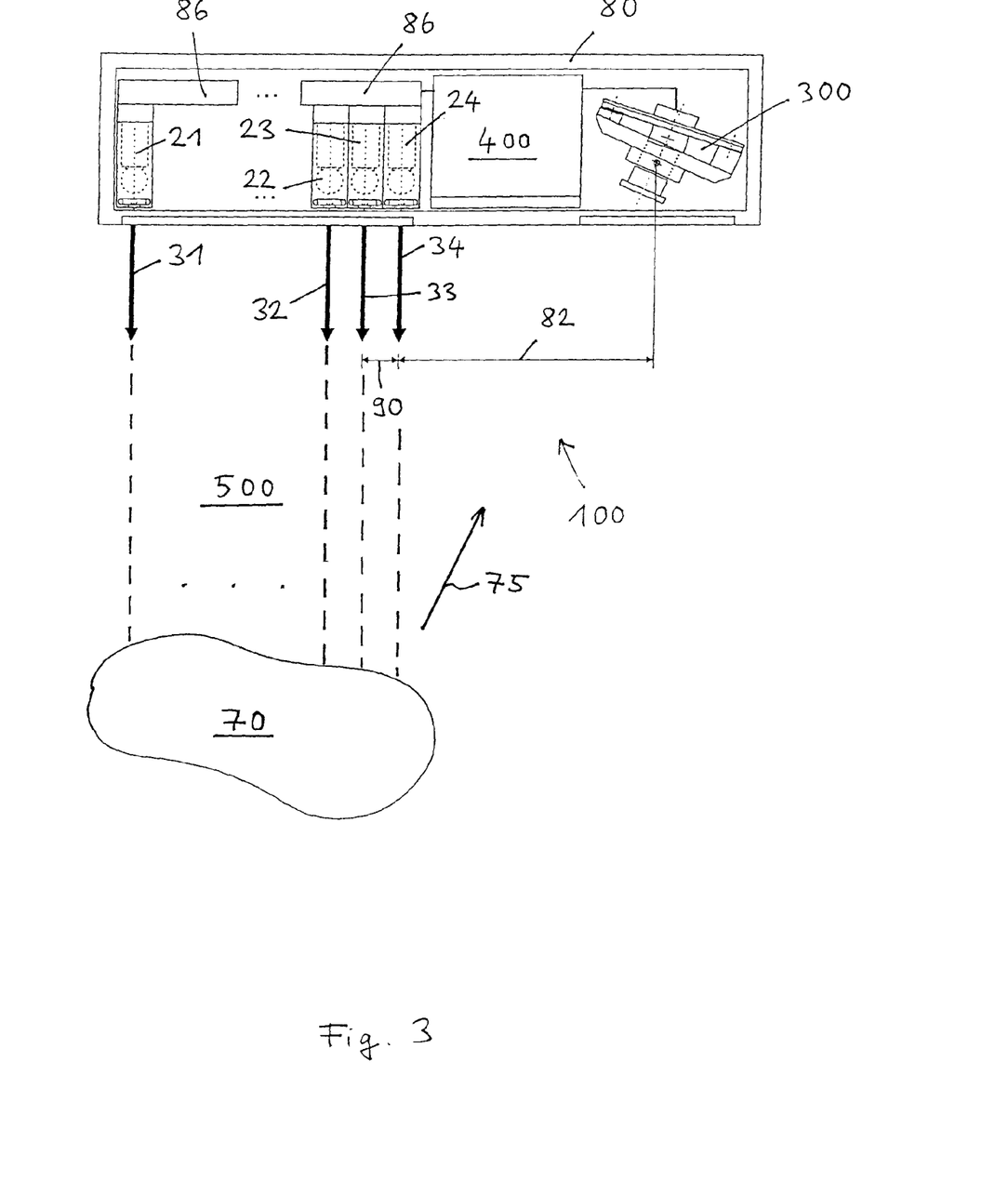
FIG. 3 shows an exemplary embodiment of a device for carrying out the method of the invention.

The exemplary embodiment shown in FIG. 3 has a detector unit 300 disposed in the outer right-hand zone of the housing 80, the optical axis of which detector unit is tilted toward an observation zone 500.

Figure 4:
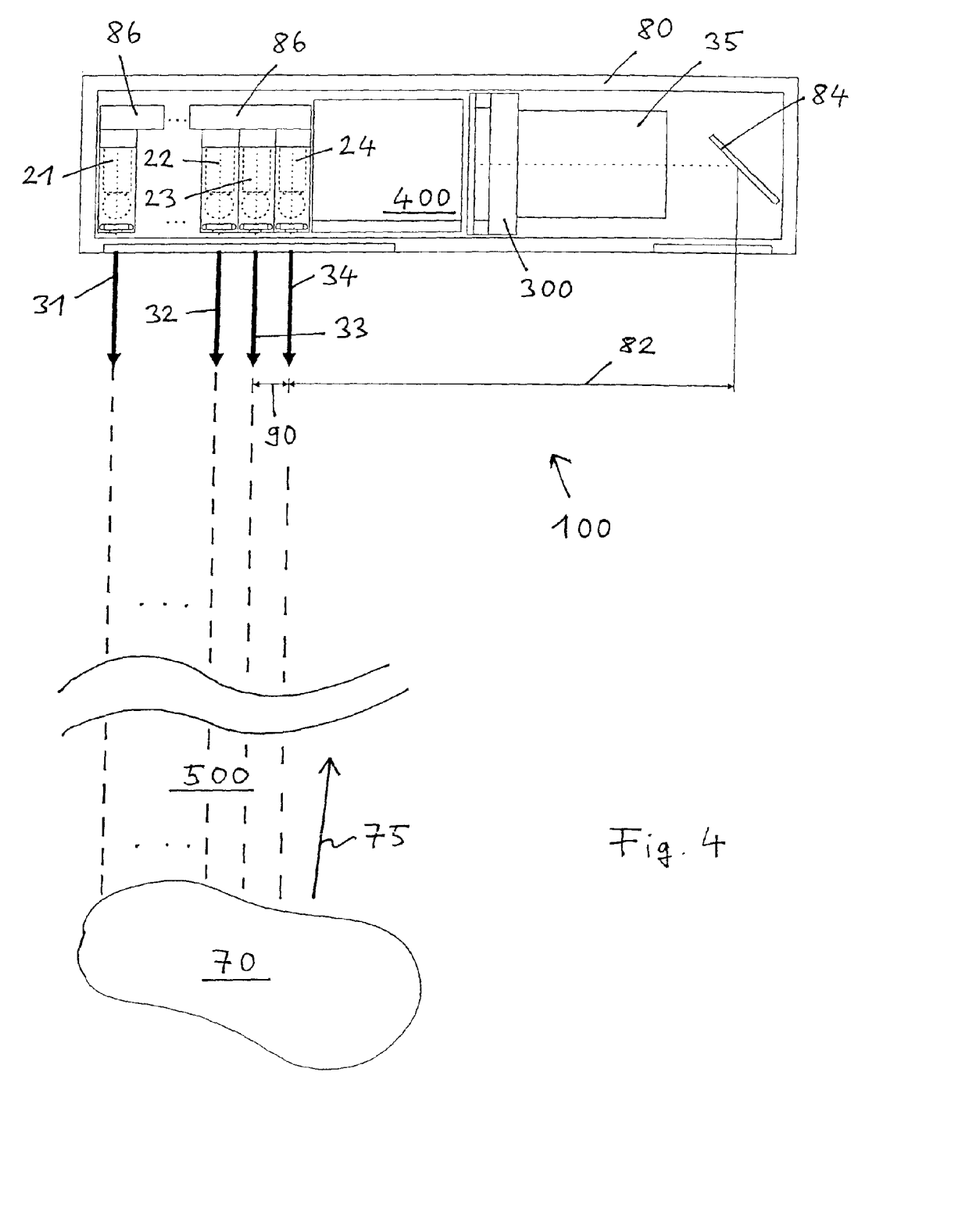
FIG. 4 shows another exemplary embodiment of a device for carrying out the method of the invention.

A base width 82 larger than in the arrangement shown in FIG. 3 is achieved with the variant illustrated in FIG. 4. Thus using the exemplary embodiment shown in FIG. 4, it is also possible to examine objects from a greater distance. This is achieved by using a mirror 84 to direct the light radiated back by the object 70 to be detected to the detector unit 300. Due to the greater distance and hence to the smaller angles, a larger objective 35 is required in order to achieve the same lateral resolution. The deflection of the beam by the mirror 34 results in the additional advantage that this larger objective 35 can be installed in the housing 80 rotated about an angle of 90° compared with the arrangement shown in FIG. 3, the installation being readily achieved due to the larger base width 82.

Figure 5:
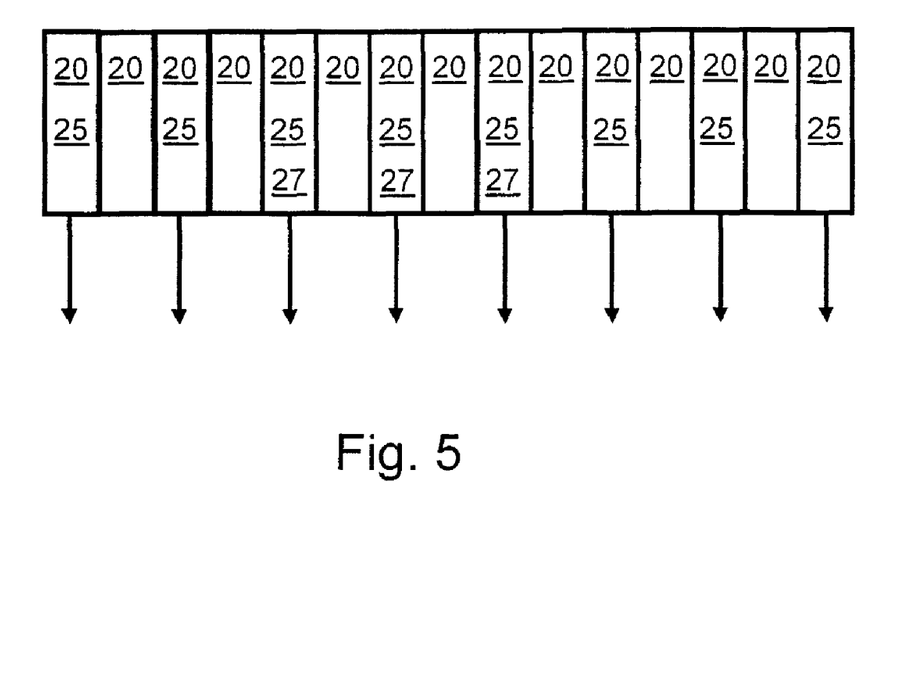
FIG. 5 is a diagrammatic view of a first selection of transmission modules.

A simple variant of the method of the invention is explained with reference to FIGS. 5 and 6. In each of these figures, an arrangement of a total of 14 transmission modules 20 is illustrated diagrammatically. Transmission modules 25 pertaining to a first selection are activated for the purpose of carrying out an overview measurement, these being every other transmission module 20 as illustrated in the diagrammatic example shown in FIG. 5. This means that when using the selection thus made, the spatial resolution is equal to one half of the maximum spatial resolution possible with this arrangement of transmission modules.

The transmission modules 25 pertaining to the first selection can in particular be activated for the purpose of carrying out an overview scan, that is, in a temporal sequence. For example, starting from the left, the first transmission module 25 can be activated, then the second transmission module from the left, etc., until the transmission module 25 on the far right of FIG. 5 is reached.

In the example illustrated, the signal caused by the transmission modules 27 differs from a background or reference signal. This means that there is an object in the zone of the light pattern generated in the observation zone by the transmission modules 27.

Transmission modules 26 pertaining to a second selection are activated for the purpose of carrying out an object measurement to be performed according to the method of the invention. This is illustrated diagrammatically in FIG. 6. In contrast to FIG. 5, a total of seven directly juxtaposed transmission modules 26 are activated. As already explained with reference to FIG. 5, this activation can be carried out in particular as described for an object scan, in other words in a temporal sequence. The transmission modules 26 cover precisely the zone of the transmission modules 27, which had produced a signal differing from the background signal or reference signal in the overview measurement or the overview scan. This means that the object present in this zone is measured with greater precision by the transmission modules 26.

Figure 6:
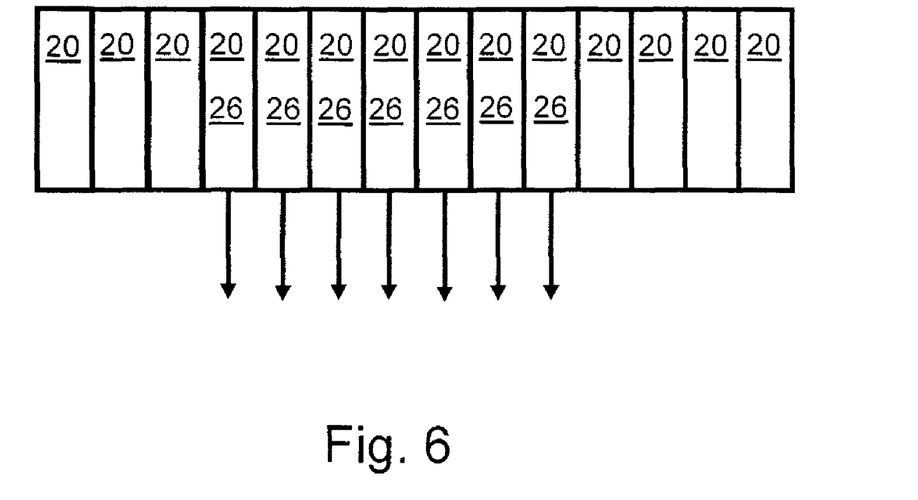
FIG. 6 is a diagrammatic view of a first example of a second selection of transmission modules for performing an object measurement.
Figure 7:
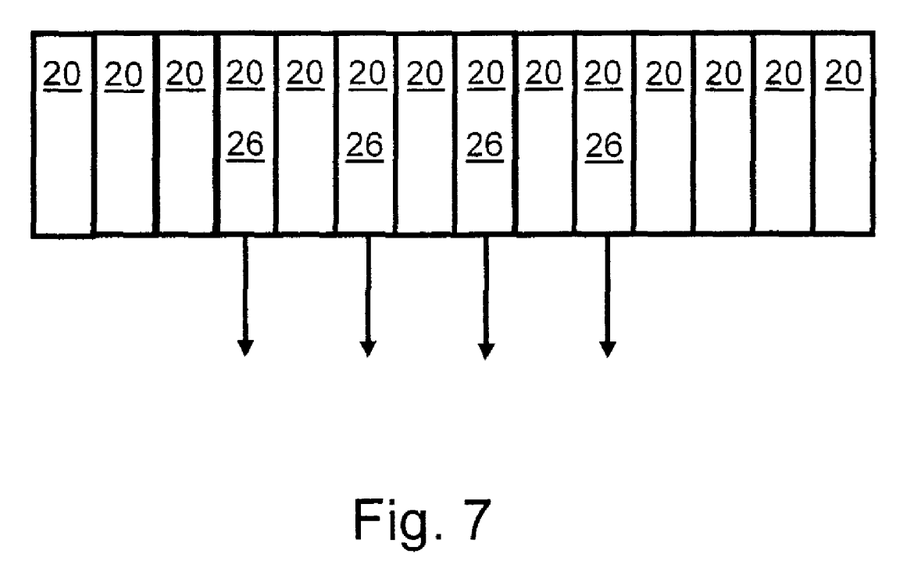
FIG. 7 is a diagrammatic view of a second example of a second selection of transmission modules for performing an object measurement.

An alternative to the second selection of FIG. 6 is illustrated in FIG. 7. In contrast to the second selection of FIG. 6, the activated transmission modules 28 are always separated by an interposed transmission module 20. The desired improved spatial resolution is achievable with this selection in conjunction with the analysis result obtained for the transmission modules 27 in the prior overview measurement. In principle, this method can be generalized. Doing so simply involves using, rather than repeating, the measurements of the overview scan already obtained for an object to be detected or identified when carrying out a specific object measurement. However, this method is only feasible if the measurement situation, in other words the position of the object in the observation zone, changes only negligibly, if at all, between the overview measurement and the object measurement.

The present invention provides a novel method for detecting objects in which an arrangement of light section sensors is operated in a very time-saving manner. This method is of interest for all applications requiring a particularly quick and independent object recognition and detection of the position and/or shape of objects.

An idea underlying the method of the invention for operating a laser light section sensor is that a situation to be observed is initially scanned with low resolution and is then, once an object has been detected, measured more precisely with a finer and, in particular, independently adjustable resolution. To this end, use is made of laser light section sensors with a plurality of transmission modules. Using a bus system, more particularly a serial bus system, it is thus possible, prior to each scan, to independently set those transmission modules that will be activated and those transmission modules that will remain inactive.

The situation frequently arises in which certain information, such as size and/or shape, of the object or objects to be detected is already available, and it is only necessary to determine the position of this object in the actual setup. The information can then be fed in for each individual mode how the individual transmission modules are activated. In principle, it is also possible to start a scan with an initially relatively coarse raster grid and then to increase the resolution within one and the same scan once an object has been encountered. This variant of the method can also be termed "successive approximation." Furthermore, it is also possible to set the resolution differently for different objects, while it should be noted that, according to the sampling theorem, the raster spacing with which the situation is scanned is advantageously such so that it is at most half as large as the object to be detected.

Potential application fields for the method of the invention can generally be in the field of robotics. For example, the transmission modules can be arranged in a raster grid of up to 5 mm. In principle, systems of any length are possible. For example, a sensor can have an overall length of 1 m and accordingly contain 200 transmission modules. Generally it is also possible to equip only certain slots of a raster grid with transmission modules, depending on the specific application. For example, only every fourth slot might be equipped with a transmission module if this suffices for the particular project.

The invention claimed is:

1. A method for detecting objects,
    in which a light pattern is beamed by a plurality of transmitting modules into an observation zone, the transmitting modules being spaced to each other,
    in which light radiated back from the observation zone is detected by at least one spatially resolving detector unit,
    in which a surface contour of an object located in the observation zone is determined on a basis of the detected light according to a light section principle,
    in which a maximum spatial resolution is caused by intervals at which the transmitting modules are spaced from each other,
    wherein in an overview measurement, a first selection of transmission modules is activated,
    wherein a first spatial resolution is defined by the first selection of transmission modules,
    wherein in an object measurement, a second selection of transmission modules is activated,
    wherein a second spatial resolution is defined by the second selection of transmission modules or by the second selection of transmission modules together with at least a selected number of the transmission modules pertaining to the first selection, which second spatial resolution is greater than the first spatial resolution.

2. The method as defined in claim 1,
wherein information concerning objects to be detected is taken into consideration when selecting the transmission modules of the overview measurement and of the object measurement.

3. The method as defined in claim 1,
wherein the transmission modules each emit light of at least two different wavelengths and the light having the at least two different wavelengths is transmitted along a common optical path toward the object.

4. The method as defined in claim 1,
wherein only non-visible light is detected and used for the evaluation.

5. The method as defined in claim 1,
wherein light from at least two different wavelengths is detected,
wherein the wavelength of the at least two different wavelengths for which a signal to noise-ratio is greatest is determined, and
wherein the evaluation is carried out for the thus determined wavelength.

6. The method as defined in claim 1,
wherein the light pattern used is a striped pattern.

7. The method as defined in claim 1,
wherein the transmission modules are activated in a temporal sequence.

8. The method as defined in claim 1,
wherein the transmission modules are accommodated in a housing and are equally spaced.

9. The method as defined in claim 1,
wherein identical light patterns are projected by the transmission modules into the observation zone.

10. The method as defined in claim 9,
wherein the identical light patterns are projected by the transmission modules in parallel into the observation zone.

11. The method as defined in claim 1,
wherein at least one of: the transmission modules pertaining to the first selection or the transmission modules pertaining to the second selection are spaced from each other by identical intervals.

12. The method as defined in claim 1,
wherein at least one of: for carrying out an overview scan, transmission modules pertaining to the first selection which are adjacent to each other, or for carrying out an object scan, transmission modules pertaining to the second selection which are adjacent to each other, are activated in direct temporal succession.

13. The method as defined in claim 1,
wherein at least one transmission module pertaining to the second selection is disposed between each of the transmission modules included in the selected number of modules pertaining to the first selection.

14. The method as defined in claim 1,
wherein in the case of the second spatial resolution a smallest interval of the light pattern generated by the transmission modules is smaller than one half of a linear dimension of an object to be detected.

15. The method as defined in claim 1,
wherein an overview measurement is stopped as soon as an object has been found, whereupon an object measurement is carried out.

16. The method as defined in claim 1,
wherein an overall region registered in the overview measurement is greater than that registered in the object measurement.

* * * * *